April 8, 1958     J. C. OWEN     2,829,847
CONTROL SYSTEM
Filed March 10, 1951
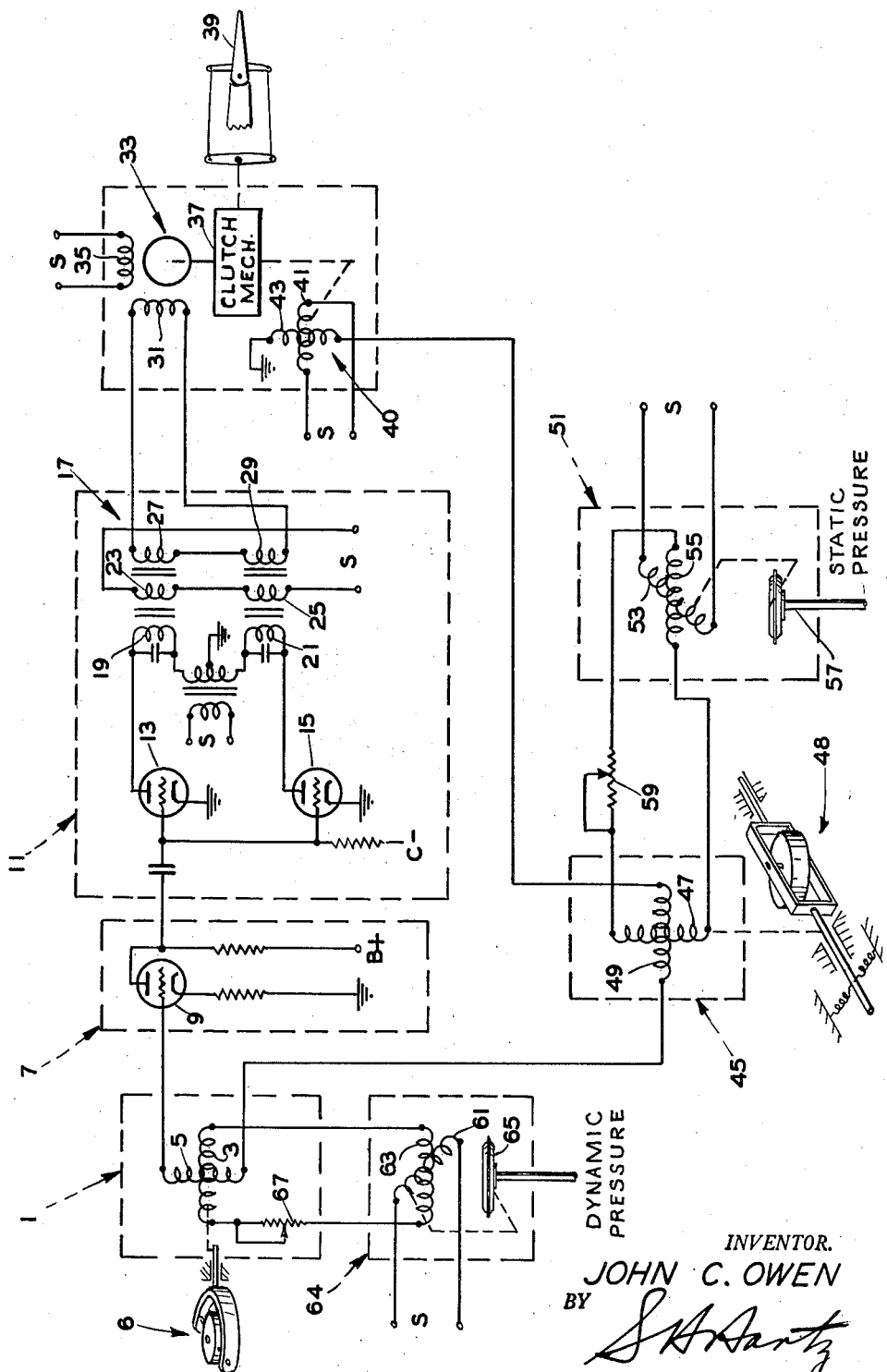
INVENTOR.
JOHN C. OWEN
BY
ATTORNEY

United States Patent Office 2,829,847
Patented Apr. 8, 1958

2,829,847

CONTROL SYSTEM

John C. Owen, Palisades Park, N. J., assignor to Bendix Aviation Corporation, Teterboro, N. J., a corporation of Delaware Application March 10, 1951, Serial No. 214,992

11 Claims. (Cl. 244—77)

The invention relates to control systems, and more particularly to automatic control systems for mobile craft.

When an aircraft is controlled by an automatic pilot of the kind used heretofore, the air mass in which the craft flies damps oscillation of the craft about the roll, pitch and yaw axes, as determined by the design of the craft. This natural aerodynamic damping effect is usually greatest about the roll axis because of the large wing area, somewhat less about the pitch axis, and least about the yaw axis because of the relatively small area of the stabilizer and control surfaces. The aerodynamic damping effect is a function of air density and diminishes with increase in altitude due to decrease in air density.

In many instances, natural damping alone is not sufficient to prevent oscillation of the craft about the roll, pitch and yaw axes, and artificial damping, conveniently controlled by an angular rate gyroscope acting on the automatic pilot, is provided to further damp the craft and prevent its oscillation about the several axes.

The sum of natural damping and artificial damping must remain substantially constant for uniform control of the craft. If the artificial damping about each axis is adjusted for optimum control of the craft by the automatic pilot at low altitudes, then at high altitudes, the craft will oscillate about the several axes because the natural damping decreases. Likewise, if the artificial damping about each axis is adjusted for optimum control of the craft by the automatic pilot at high altitudes, the craft will be over-damped at low altitudes and will react sluggishly.

One object of the present invention is to provide uniform response characteristics of the craft at all altitudes to the automatic control system by maintaining the total damping of the craft substantially constant.

Another object is to provide optimum damping of the system at all altitudes.

Another object is to vary artificial damping of the craft in opposition to the change in its natural damping to maintain total damping of the craft substantially constant.

Another object is to increase the artificial damping of the craft as the density of the fluid medium in which the craft is moving decreases.

Another object is to provide means for changing the total damping of the craft by adjusting the artificial damping provided by the automatic control to change the response characteristics of the craft.

Just as natural aerodynamic damping of the craft about the several control axes is effected by change in altitude, so the natural static stability of the craft about the several control axes changes as a function of the dynamic pressure—that is, with change in altitude and change in speed of the craft. This change in stability of the craft is undesirable because the response characteristics of the craft are altered.

Therefore, another object of the invention is to maintain the response characteristics of the craft substantially constant by providing artificial static stability to the craft through the control system, as determined by the dynamic pressure, to supplement the natural static stability of the craft.

Another object is to maintain the sum of the artificial static stability and the natural static stability of the craft substantially constant to maintain the response characteristics of the craft substantially the same.

Another object is to provide means for changing the response characteristics of the craft by adjusting the artificial static stability of the craft independently of dynamic pressure and thereby change the total static stability of the craft.

The invention contemplates a system for controlling a craft about a predetermined axis by operating a control element, including means responsive to rate of change of attitude of the craft about the predetermined axis and adapted to provide a rate signal, means responsive to the signal for operating the control element, and means for varying the signal as a function of the change in natural damping of the craft. The rate responsive means may comprise an angular rate generator responsive to the rate of change of attitude of the craft about the predetermined axis, and means for varying the output of the rate generator as a function of the density of the fluid in which the craft is moving.

The invention also contemplates a system of the kind described for maintaining the response characteristics of the craft substantially constant irrespective of the speed of the craft and the density of the fluid through which the craft is moving. The system may include, in addition to the elements mentioned above, a signal generator responsive to the attitude of the craft and adapted to produce a control signal, and means responsive to the speed and density of the fluid in which the craft is moving for altering the control signal independently of the attitude of the craft. The means for operating the control element is responsive to the control signal and to the rate signal.

The single figure of the drawing is a schematic wiring diagram of an automatic control system constructed according to the invention for controlling the craft about one axis.

Referring now to the drawing for a more detailed description of the novel control system for controlling movement of a craft about one axis, the system includes an inductive signal generator 1 having a rotor winding 3 energized by an alternating current source S in the manner described below and a stator winding 5 inductively coupled thereto. The rotor winding may be displaced angularly by a gyroscope 6 responsive to the roll attitude, the pitch attitude or the yaw attitude of the craft, as determined by the axis about which the control system is controlling the craft. The signal induced in stator winding 5 by angular displacement of rotor winding 3 is applied to an amplifier 7 of any desired number of stages of amplification, and herein shown as a single stage 9. The amplified signal is applied to a discriminator 11, including a pair of triodes 13, 15 to determine the phase of the amplified signal.

A magnetic amplifier 17 receives the output of the discriminator and includes a pair of control windings 19, 21 connected in the plate circuits of triodes 13, 15. The magnetic amplifier also has a pair of primary windings 23, 25 connected in series aiding relation with one another to alternating current source S, and a pair of secondary windings 27, 29 connected in series opposition with one another to the variable phase 31 of a two-phase induction motor 33. The fixed phase 35 of motor 33 is energized by alternating current source S. Windings 19, 23, 27 and windings 21, 25, 29 are wound on separate cores. One or the other of the control windings 19, 21 passes current as determined by the phase of the amplified signal to saturate the associated core, and an alternating voltage is induced in the secondary winding on the other core to energize variable phase 31 and operate motor 33 in one direction or the other.

Motor 33 is drivably connected through reduction gearing and clutch mechanism 37 to a control surface 39 of the craft. The control surface may control the craft about the roll, pitch or yaw axes and if the control system is mounted in aircraft, the system may control craft ailerons, elevators or rudders.

A follow-up inductive device 40 includes a rotor winding 41 drivably connected through reduction gearing 37 to motor 33 and energized by alternating current source S, and a stator winding 43 connected in series with signal generator 1 and inductively coupled to rotor winding 41.

An inductive device 45 has a rotor winding 47 controlled by a rate gyroscope 48 responsive to the rate of roll, the rate of pitch, or the rate of yaw of the craft. Inductive device 45 includes a stator winding 49 inductively coupled to rotor winding 47 and connected in series with stator winding 5 of signal generator 1, and with stator winding 43 of follow-up device 40.

The structure described is well known in the art and any suitable arrangement may be used for controlling the craft control surfaces as long as the system includes a device responsive to the angular rate of movement of the craft about the control axis.

One novel feature of applicant's arrangement comprises changing artificial damping of the craft by varying the magnitude of the rate signal in response to the density of the fluid in which the craft is moving. A rotary transformer 51 includes a rotor winding 53 connected to alternating current source S, and a stator winding 55 inductively coupled thereto and connected in series with rotor winding 47 of rate signal generator 45. Rotor winding 53 of rotary transformer 51 may be controlled by a density sensitive device, such as a barometric pressure sensitive device 57, so that as the altitude of the craft increases, energization of rate generator 45 increases.

The novel system described provides for decreased artificial damping at low altitudes and for increased artificial damping at high altitudes to off-set the change in the aerodynamic damping effect of the air mass on the craft with change of density.

The response characteristics of the craft may be changed as desired by changing the artificial damping of the control system by a rheostat 59 connected in series with rotor winding 47 of inductive device 45, and stator winding 55 of variable transformer 51. Rheostat 59 is adjusted to provide suitable response characteristics of the craft, and the system described maintains the selected response characteristics of the craft irrespective of the density of the fluid in which the craft is moving.

Artificial stability of the craft is controlled by varying angular displacement of the control surfaces as a function of the speed of the craft and density of the fluid in which the craft is moving. In aircraft, angular displacement of the control surface is varied as a function of the dynamic pressure of the air mass. When the craft is moving at high speed or at low altitudes and departs from its predetermined course, less angular displacement of the control surface is required to return the craft to its course than if the craft were moving at low speed or at high altitudes. To control angular displacement of the control surface in accordance with the speed and altitude of the craft, energization of the rotor of signal generator 1 is varied as a function of the dynamic pressure.

A rotary transformer 64 has a rotor winding 61 energized by power source S and a secondary winding 63 inductively coupled thereto and connected in series with rotor winding 3 of signal generator 1. Angular displacement of rotor winding 61 relative to stator winding 63 is determined by a dynamic pressure sensitive device 65. With this arrangement, energization of signal generator 1 is varied as a function of the speed and altitude of the craft so that the magnitude of the signal provided by signal generator 1 for a given displacement of the craft from a predetermined attitude about the control axis is greater at low speeds or high altitudes than at high speeds or low altitudes.

The response characteristics of the craft may be changed also by changing its artificial stability. A rheostat 67 is connected in series with rotor winding 3 of signal generator 1 and with stator winding 63 of rotary transformer 64 so that the control signal amplitude may be changed for a given angular displacement of rotor winding 3 relative to stator winding 5.

With the arrangement described, uniform response characteristics of the craft by the automatic control system are provided at all altitudes and at all speeds by maintaining the total damping and total static stability of the craft substantially constant. Also, the response characteristics of the craft may be adjusted as described by changing the total damping or the total static stability of the craft.

Although but one embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art.

What is claimed is:

1. In a system for controlling a craft about an axis, first means responsive to the attitude of the craft about said axis providing an attitude signal to stabilize said craft about said axis, second means responsive to the rate of change of attitude about said axis providing a rate signal for artificially damping the action of the craft about said axis, the total damping afforded the aircraft about said axis being the sum of the aerodynamic damping due to design characteristics of the craft and said artificial damping due to said rate signal, said aerodynamic damping being variable as a function of change in craft altitude, means responsive to change in altitude for modifying said second means so that the sum of the damping remains constant despite changes in altitude, and means responsive to said signals for controlling said craft.

2. A system for operating a control surface to control the attitude of an aircraft about an axis, comprising means responsive to the rate of change of attitude of the craft about said axis for providing an electric signal having a sense and magnitude corresponding to the direction and rate of change of attitude, means for varying the magnitude of said signal for a given rate of change of attitude as a function of the altitude of the craft to artificially damp the action of the craft about said axis, means responsive to said signal and adapted to be connected to said surface for operating the latter, and adjustable means for varying the relative magnitude of said signal with respect to a given rate of change of attitude independently of the altitude of the craft for changing the value of the artificial damping of the craft.

3. A system for operating a control surface to control the attitude of a craft about an axis, comprising reference means responsive to the rate of change of attitude of the craft for providing a rate signal, the rate of change of attitude of said craft for a given surface displacement varying as a function of the density of the air in which the craft is moving, and the density of the air varying with altitude, means responsive to said density as a function of altitude for changing the value of the rate signal so that the sum of the natural and artificial damping of the craft remains substantially constant, power means responsive to the signal and adapted to be connected to said surface for operating the latter, and adjustable means for varying the rate signal to change the artificial damping of the craft independently of its natural damping so as to change the response characteristics of the craft.

4. A system for operating a control element to control the attitude of a craft about an axis, comprising a rate gyro responsive to the rate of change of attitude of the craft about said axis, signal means actuated by said rate gyro for producing a rate signal, power means responsive to said rate signal for operating said surface, an alternating power source, a rotary transformer connected to said power source and to said signal means for energizing said signal means, and means responsive to change of altitude of the craft operating said rotary transformer to change energization of said signal means, whereby the amplitude of the rate signal for a given rate of change of attitude is varied as a function of the altitude of the craft.

5. A system for operating a control element to control the attitude of a craft about an axis, comprising a device responsive to the rate of change of attitude of said craft, signal means adapted to be energized and actuated by said device for producing an electric signal corresponding in amplitude and phase to the amount and direction of the rate change of attitude of the craft about said axis, the amplitude of the signal for a given actuation being a function of the energization, power means responsive to said signal and adapted to be connected to said control element for operating the control element, means responsive to change in altitude of the craft, and means operated by said altitude responsive means for varying the energization of said signal means independently of the rate of change of attitude of the craft.

6. A system for operating a control element to control the attitude of a craft about an axis, comprising attitude signal means producing an attitude signal in response to deviation in the attitude of the craft about said axis, rate signal means in circuit with said attitude signal means and producing a rate signal in response to the rate of change of attitude of the craft about said axis, means responsive to dynamic pressure to attenuate said attitude signal as a function of airspeed so as to vary the value of the altitude signal independently of the attitude of the craft, means responsive to the altitude of the craft to modify said rate signal as a function of altitude so as to vary the value of the rate signal independently of the rate of change of attitude of the craft, and power means responsive to the signals for operating the control element.

7. In a system for operating a control element to control the attitude of a craft about an axis, apparatus for maintaining the response characteristics of the craft substantally constant irrespective of the speed of the craft and the density of the fluid through which the craft is moving, comprising first signal means responsive to the attitude of the craft about said axis for producing an attitude signal, means responsive to the speed of the craft for altering the attitude signal so that the attitude signal for a given attitude deviation becomes smaller as the speed of the craft increases, second signal means responsive to the rate of change of attitude of the craft about said axis for producing a rate signal, means responsive to the density of the fluid through which the craft is moving for altering the rate signal so that the rate signal for a given rate of change of attitude becomes larger as the altitude of the craft increases, and means responsive to the signals for operating said control element.

8. Apparatus for operating a control surface to control the attitude of an aircraft about an axis so as to maintain the response characteristics of the craft substantially constant irrespective of the craft speed and altitude, comprising a first signal system including means responsive to the attitude of the craft about said axis for producing an attitude signal and means responsive to the speed of the craft for decreasing the magnitude of said attitude signal as the craft gains speed independently of the attitude of the craft, a second signal system including means responsive to the rate of change of attitude of the craft about said axis for producing a rate signal and means responsive to the altitude of the craft for increasing the magnitude of the rate signal as the craft gains altitude independently of the rate of change of attitude of the craft, and power means responsive to the signals from said system for operating the control surface.

9. In a system for operating a control surface to control the attitude of an aircraft about an axis, means for maintaining the response characteristics of the craft substantially constant irrespective of the speed of the craft and the altitude at which the craft is flying including first signal means responsive to the attitude of the craft about said axis for producing an attitude signal, means responsive to the speed of the craft for decreasing the magnitude of said attitude signal as the craft gains speed independently of the attitude of the craft, second signal means responsive to the rate of change of attitude of the craft about said axis for producing a rate signal, means responsive to the altitude of the craft for increasing the magnitude of the rate signal as the craft gains altitude independently of the rate of change of attitude of the craft, further means for altering the rate signal independently of the rate of change of attitude of the craft and independently of the altitude of the craft to change the response characteristics of the craft, and means responsive to the signals for operating said control surface.

10. Apparatus for damping the oscillation of a craft about an axis, comprising a servomotor for controlling said craft, reference means responsive to the rate of change of attitude of said craft caused by said oscillation about said axis, signal means actuated by said reference means for developing for the operation of said servomotor a signal corresponding in amplitude to said rate of change of attitude, means providing excitation to said signal means whereby said amplitude is also a function of said excitation, and means operatively connected with said signal means and responsive to the altitude of the craft for varying the excitation of said signal means to increase the amplitude of said signal for a given rate of change of attitude as the craft gains altitude to increase the artificial damping as the natural damping afforded by the design of the craft diminishes whereby the total damping effect remains substantially constant.

11. A system for controlling a craft about a predetermined axis by operating a control element, comprising an inductive signal generator having a pair of windings inductively coupled with one another, a rotary transformer including a pair of relatively rotatable windings inductively coupled with one another, one of said transformer windings being energized by an alternating power source and the other of said transformer windings being connected to one of the windings of said signal generator, means responsive to the rate of change of attitude of the craft for operating said signal generator and inducing a control signal in the other winding of said signal generator, means responsive to barometric pressure operatively connected to one of said transformer windings for varying energization of said signal generator to vary the amplitude of the control signal independently of the rate of change of attitude of the craft, and means responsive to the control signal adapted to be connected to said control element for operating the control element.

References Cited in the file of this patent

UNITED STATES PATENTS

| 2,137,974 | Fischel | Nov. 22, 1938 |
| 2,232,982 | Tank | Feb. 25, 1941 |
| 2,387,795 | Issersted | Oct. 30, 1945 |
| 2,499,664 | Meredith | Mar. 7, 1950 |
| 2,512,902 | Rossire | June 27, 1950 |
| 2,528,575 | Broadbent | Nov. 7, 1950 |
| 2,597,892 | Nash | May 27, 1952 |
| 2,619,623 | Meredith | Nov. 25, 1952 |
| 2,621,003 | Meredith | Dec. 9, 1952 |
| 2,686,022 | Hanna et al. | Aug. 10, 1954 |

FOREIGN PATENTS

| 611,008 | Great Britain | Oct. 25, 1948 |